INVENTOR.
HIDEO BABA

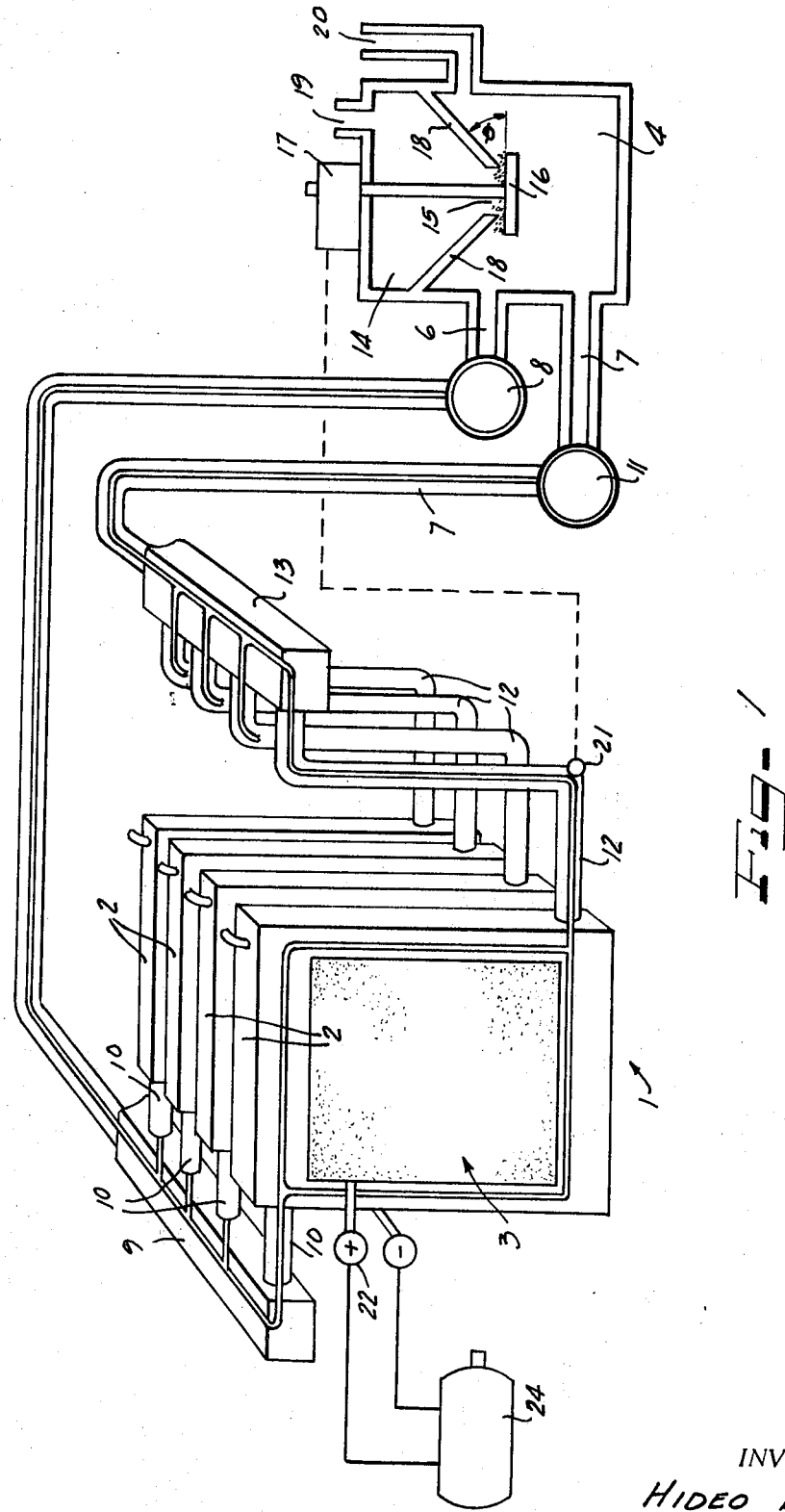

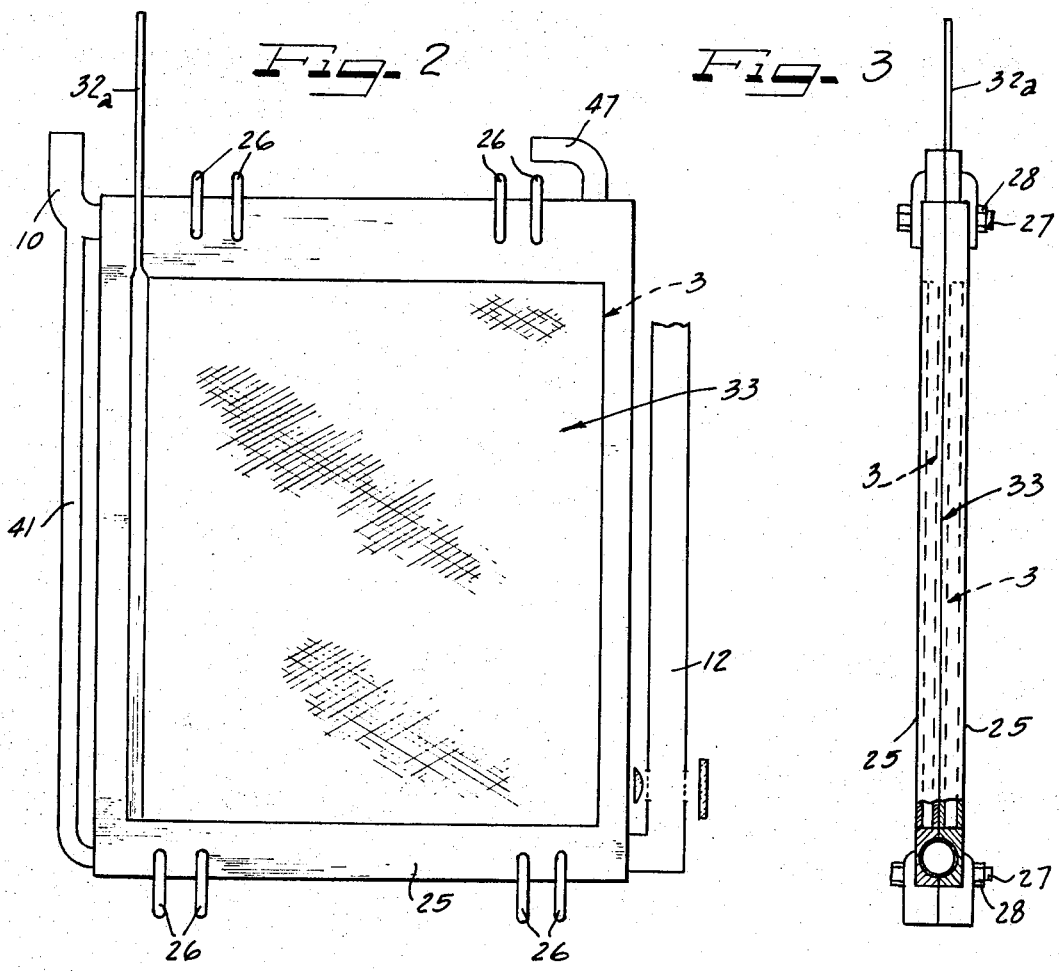
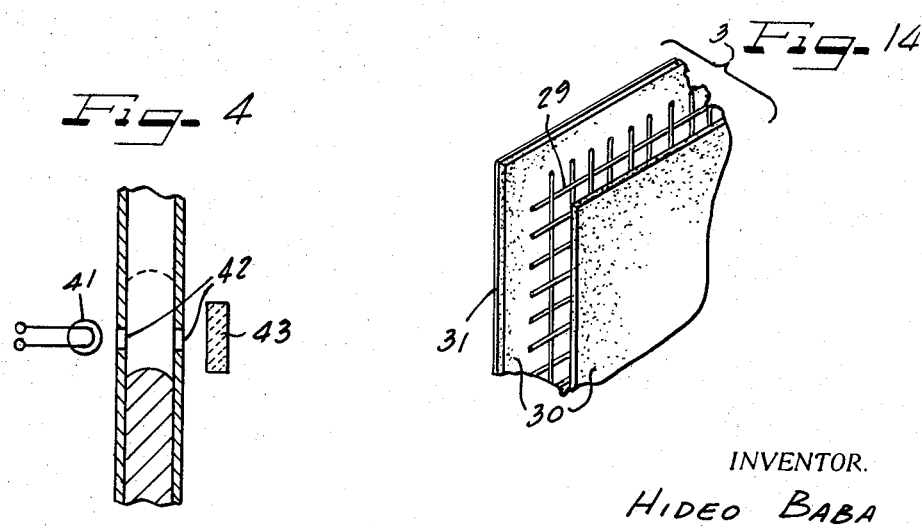

INVENTOR.
HIDEO BABA
BY Hill, Sherman, Meroni, Gross & Simpson ATTORNEYS

United States Patent Office 3,758,342
Patented Sept. 11, 1973

3,758,342
METAL FUEL BATTERY AND SYSTEM
Hideo Baba, Tokyo, Japan, assignor to Sony
Corporation, Tokyo, Japan
Continuation-in-part of application Ser. No. 776,548,
Nov. 8, 1968. This application Feb. 23, 1971, Ser.
No. 117,901
Claims priority, application Japan, Nov. 20, 1967,
42/74,625; Apr. 7, 1970, 45/29,689
Int. Cl. H01m 29/04
U.S. Cl. 136—86 A
21 Claims

ABSTRACT OF THE DISCLOSURE

A metal fuel battery having a number of cells, each cell having at least one gas diffusion electrode (positive electrode) and one cathode collector electrode (negative electrode) periodically between which a liquid electrolyte having powder metal fuel dispersed therein is caused to flow in a downward direction. The battery is used in a system in which the metal fuel is replenished from time to time as is also the electrolyte.

CROSS-REFERENCE TO RELATED APPLICATION

This application is a continuation-in-part of my copending U.S. application, Ser. No. 776,548, filed Nov. 8, 1968 now Pat. 3,592,689. Other possibly related applications include the Baba et al. U.S. applications, Ser. No. 810,065, new Pat. 3,553,032, and Ser. No. 836,186, now Pat. 3,681,146; and two abandoned applications, Ser. No. 716,-718 and Ser. No. 589,340.

In my said copending application Ser. No. 776,548 I have disclosed a metal fuel battery in which one or more gas diffusion electrodes from one or more of the vertical walls of a liquid containng battery cell. A negattve electrode of planar shape extends vertically within the cell and in spaced relation to the gas diffusion electrodes. The gas diffusion includes a catalyst such as silver and preferably other electrical conductive material such as carbon. An electrolyte such as potassium hydroxide having a very finely divided metal powder such as zinc is circulated through the cell. Means associated with the negative electrode at least temporarily traps some of the metal powder. The fuel powder must not be soluble in the electrolyte but the spent fuel, such as the oxide of the metal, should be soluble in the electrolyte but the spent fuel, such as the oxide of the metal, should be soluble in the electrolyte. No catalyst is needed for the negative electrode and no catalyst is contained in the eelctrolyte.

The operation of such metal fuel batteries may be better understood by considering the following simplified theoretical explanation and it will be understood that this theory is not determinative of the invention. Generally, a gas diffusion electrode has a three-phase interface therein comprised of an oxygen phase, a silver phase in contact with the oxygen phase and an electrolyte phase in contact with the silver phase and oxygen and water molecules are converted into hydroxy ions, which pass through the electrolyte, contacting the powdered zinc and converting the zinc metal into zinc ions and free electrons. When the gas diffusion electrode and the negative electrode are electrically connected to an external load, there will be an electric current flow.

A plurality of cells are disclosed and electrolyte with metal fuel suspended therein is continuously circulated through all of the cells all of the time.

Ser. No. 810,065 discloses a specific method of making a metal fuel cell electrode.

Ser. No. 836,186 relates to a specific method of making one form of fuel cell electrode.

Ser. No. 716,718 was the parent application of Ser. No. 836,186 and was directed to the product produced by the method of the later filed divisional case.

Ser. No. 589,340 is the parent case of Ser. No. 810,065 and was directed to a specific form of fuel cell electrode.

The disclosures of all of the aforesaid applications are incorporated herein by reference.

A metal fuel battery of the type disclosed in my copending application, Ser. No. 776,548 Pat. 3,592,698 is believed to be basically new and no prior art which either shows or suggests such a battery type is known to applicant.

BACKGROUND OF THE INVENTION

Field of the invention

This invention relates to a metal fuel battery comprised of a plurality of cells employing a metal fuel suspended in an electrolyte, and to a system including such a battery in which means are provided for feeding the electrolyte with its suspended metal fuel to each cell of the battery intermittently.

Description of the prior art

The present application distinguishes from Ser. No. 776,548, in that in the present improvement, the electrolyte is only intermittently fed to each battery cell. Here the fuel density in the electrolyte is sensed and additional metal fuel is added to the system when a predetermined condition is sensed. Further an improved form negative electrode is provided and also an improved form of positive electrode is provided. Still further, the electrolyte saturation point for the zinc oxide is raised by the addition of another chemical to the electrolyte. Other details of the system are also believed novel.

There are many types of gas and liquid fuel batteries. Some employ hydrogen gas as a fuel and a catalyst material is suspended in the electrolyte. It has been suggested that air under pressure be forced through a porous metal electrode to contact electrolyte and to contact a zinc plate which is gradually consumed. Another prior art arrangement is a battery wherein molten metal is extruded through a hollow inert negative electrode to come into contact with a pressurized oxidizing agent and a molten electrolyte, the entire operation being carried out under extremely high pressures and high temperatures. One specific form of electrode suggested in the past is formed of silver impregnated carbon particles pressed into a desired electrode shape.

SUMMARY OF THE INVENTION

This invention relates to a metal fuel battery having a plurality of cells and to a system for feeding metal fuel to such a battery. In the preferred embodiment of the invention each cell of the metal fuel battery includes electrodes between which a liquid electrolyte having finely divided metal fuel dispersed therein is controllably passed between these electrodes. The system provided by this invention includes in addition to the battery, a metal fuel tank, a reservoir for storing a liquid electrolyte, means for dispersing portions of the metal fuel from the metal fuel tank at predetermined times into the electrolyte in the reservoir, means for intermittently and sequentially circulating the electrolyte, with its dispersed metal fuel, through each cell of the battery from the top thereof to the bottom.

The preferred form of metal fuel is finely divided zinc particles which have a dimension of smaller than 500 microns and preferably between 20 microns and 200 microns and being of dendritic form. The electrolyte is preferably potassium hydroxide containing some soluble alkali metal salt, preferably potassium silicate to raise the saturation point of the spent metal fuel in the electrolytes. Each gas diffusion electrode is formed by taking a mixture of silver oxide powder polytetrafluoroethylene powder, carbon powder, and ammonium carbonate powder, and pressing and heating this mixture into the form of a plate about a nickel mesh screen. The negative electrode comprises a nickel wire net sandwiched between a pair of nickel plates or copper plates plated with nickel, which have many upwardly facing pockets or shelf-like portions on an exterior surface.

BRIEF DESCRIPTION OF THE DRAWINGS

FIG. 1 is a diagrammatic view illustrating my novel metal fuel battery having electrolyte with metal fuel dispersed therein alternatively passed through each cell and then back to the original electrolyte-fuel mixing tank from which it came.

FIG. 2 is a front elevational view of one cell of my novel battery illustrating a negative electrode spaced in front of a positive electrode.

FIG. 3 is an end elevational view of the cell shown in FIG. 2.

FIG. 4 is a fragmentary sectional view of a sensing device.

FIG. 14 is a fragmentary exploded view of a gas diffusion electrode.

DESCRIPTION OF THE PREFERRED EMBODIMENT

Figure 5:
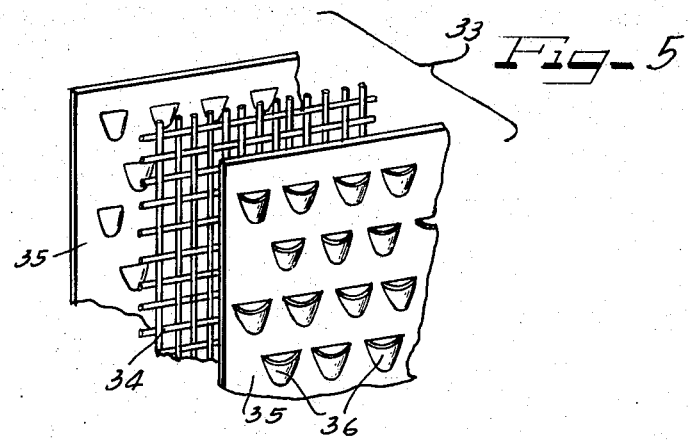
FIG. 5 is a fragmentary exploded isometric view of a portion of one preferred form of negative electrode of the metal fuel battery.

FIG. 1 of the drawings diagrammatically illustrates a metal fuel battery system embodying the novel teachings of the present invention. Specifically, there is illustrated a metal fuel battery 1 formed with a plurality of individual cells 2 arranged in side-by-side relationship. Each cell is a complete self-contained chamber which is liquid containing but which has side walls 3 which permit the passage of an oxygen containing gas therethrough into the interior. An electrolyte-fuel mixing tank 4 is closely associated with the battery 1, and this tank is provided with a feed duct 6 and a return duct 7. In the feed duct 6, a pump 8 is provided which supplies the electrolyte-fuel mixture under pressure to a manifold 9 which has inlet ducts 10, connecting the manifold 9 to the top of each cell 2. In the return duct 7, there is provided suction pump 11 which withdraws the electrolyte-fuel mixture from the bottom of each of the cells 2 through outlet ducts 12 and an outlet manifold 13.

Extending down into the mixing tank 4 is a metal fuel hopper 14 which is provided with an opening 15 at the bottom thereof which is selectively opened and closed by a valve member 16 operated from a valve actuating device 17. The bottom wall of the fuel hopper 14 is formed by two sloping metal plates 18. The angle $\theta$ formed by the side walls with the horizontal should be in excess of 20°, and the facing sides of the opening should be vertical. The supply of metal fuel in the fuel hopper 14 may be replenished through an opening 19 while the supply of the electrolyte to the mixing tank may be replenished through the electrolyte supply inlet 20.

The control mechanism for actuating the valve 16 is operated by a fuel density sensing device 21 located in the outlet duct 12 of one of the fuel cells 2. The gas diffusion electrode 3 of each of the cells 2 is connected to a power output terminal 22, while the negative electrode of each cell 2 is connected to a power output terminal 23. The two output terminals (one of which is positive and the other which is negative), in turn are arranged to be connected to any load which is to be energized thereby, such for example, an electric motor diagrammatically represented as 24.

THE CELL STRUCTURE

The structure of each cell 2 of battery 1 is shown in a preferred form in FIGS. 2, 3, 6, 7 and 14. It includes two plastic frames 25 which are each provided with four pairs of ears 26, draw bolts 27, which are positioned between confronting pairs of ears 26 in cooperation with nuts 28 which clamp the ears 26 together. Each frame 25 has its opening filled by a gas diffusion electrode 3. This electrode 3 is formed on a nickel screen 29. More particularly, the nickel screen 29 is embedded in a pressed composition of powder material 30, whose specific composition is hereinafter specified. The plate-like member formed by the nickel screen 29 embedded in the pressed porous powdered material 30 is then provided with a coating 31 of a material which is porous to the extent that an oxygen containing gas can pass therethrough, but is impervious to the passage of a liquid therethrough. One of these plate-like electrodes is then mounted in each of the two mating frame members 25 with its liquid impervious coating 31 to the outside. An electrically conducting lead 32 extends from the nickel screen and its associated powered material to the outside of the frame assembly.

A preferred form of the mixture of powder in which the nickel screen 29 is embedded is one which includes starting materials of silver oxide powder, polytetrafluoroethylene powder, carbon powder and ammonium carbonate powder in the following proportions by weight:

| | Wt. percent |
|---|---|
| Silver oxide ($Ag_2O$) powder | 6.7 |
| Polytetrafluoroethylene powder | 43.0 |
| Carbon powder | 23.0 |
| Ammonium carbonate ($NH_4)_2CO_3$ | 27.3 |

This mixture of powder is pressed about a nickel mesh to embed the same and form a plate. The plate is then heated to drive off volatile materials so that the desired degree of porosity is achieved. The silver oxide powder used easily disperse with the carbon powder and is preferred over the use of silver carbonate powder as originally disclosed in my copending application, Ser. No. 836,186. Also nickel or other electrically conductive material may be used in place of powder.

Figure 6:
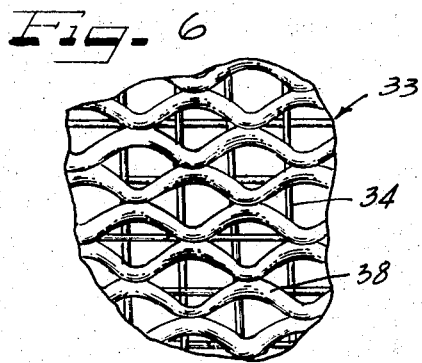
FIG. 6 is a face view of a portion of another preferred form of a negative electrode showing metal receiving pockets before finely divided metal fuel is collected therein.
Figure 7:
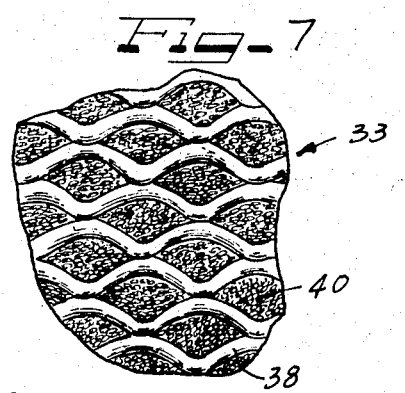
FIG. 7 is a view similar to FIG. 6, but showing the pockets after a metal fuel is collected therein.
Figure 8:
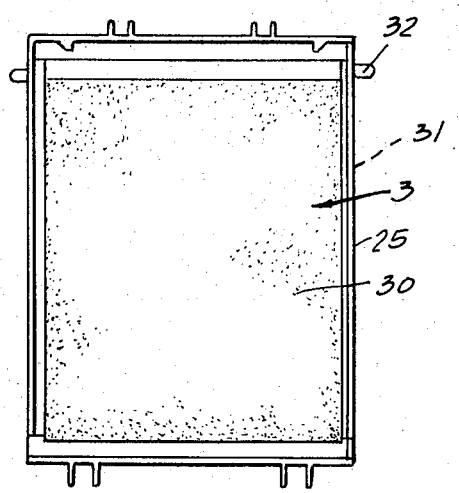
FIG. 8 is a rear view of the face of a positive electrode.
Figure 9:
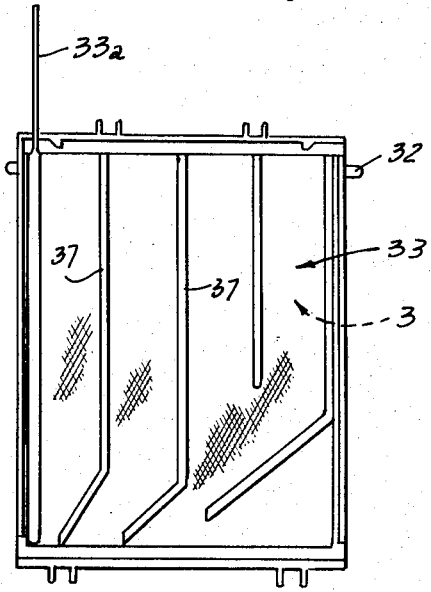
FIG. 9 is a face view of a negative electrode in its spaced position in front of the positive electrode and showing a preferred form of baffle arrangement.

The negative electrode 33 diagrammatically illustrated in the fragmentary exploded view of FIG. 5, includes a metal screen 34 sandwiched between two plates 35 having many small upwardly facing cup-like portions 36. An electrically conducting lead 32a extends from the metal screen 34 and its associated metal plates 35 to the outside of the frame assembly. This plate form of negative electrodes is sandwiched between the two positive electrodes but spaced therefrom by non-conductive ribs 37 as shown in FIG. 9. These ribs 37 also act as baffles to downwardly direct the electrolyte-fuel mixture past the upwardly facing cup-like portions 36 of the negative electrode 33 for entrapment of a portion of the fuel particles. It will be observed that the lower ends of at least some of the baffles 37 are directed toward one corner of the cell in order to direct the electrolyte-fuel mixture more uniformly over the lower portion of the negative electrode 33 as the electrolyte-fuel mixture nears the corner of the cell 2 which lies adjacent its associated outlet duct 12. A second and preferred form of negative electrode is diagrammatically illustrated in FIG. 6, where it will be observed that a rather rough screen member 38 overlies the intermediate screen 39. The two rough screens 38 have the effect of providing upwardly facing pockets suitable for collecting zinc powder from the electrolyte-zinc mixture as it flows thereover from the top to the bottom. FIG. 7 shows the same screen portion 38 as seen in FIG. 6, but illustrates an accumulation of zinc fuel powder 40 thereon.

It will now be appreciated that the fuel cell is formed by sandwiching a negative electrode between two positive electrodes with baffles separating the same and then clamping them in a pair of mating frame members 25 to form a liquid-tight cell structure. As shown in FIG. 2, an inlet pipe 10 extends into the top of each cell and an outlet pipe 12 extends from the bottom of each cell. Additionally, an inlet bypass 41 extends down and enters the cell at the bottom on the opposite side from the outlet duct 12. It will be observed that this by-pass is smaller than the main duct 10 and is used to flush out any accumulated sludge in the bottom of the cell.

THE ELECTROLYTE

The preferred form of electrolyte is potassium hydroxide having a concentration of at least 6 N. To this is added a soluble alkali metal such as potassium silicate, sodium silicate, potassium phosphate, potassium silicate, ammonium silicate, etc., in the proportion of 200 to 300 cc. of the soluble alkali metal salt to each liter of potassium hydroxide. The addition of this soluble alkali metal salt has the effect of raising the saturation point of the potassium hydroxide for hydrated zinc compound such as zinc oxide. The preferred alkali metal salt is potassium silicate, and it will be appreciated that such material contains amounts of silicon dioxide. It is believed that the solubility of the zinc oxide does not depend on the quantity of potassium silicate added, provided that there is approximately 200 to 300 cc. of potassium silicate solution added to each liter of potassium hydroxide. A preferred weight ratio of silicon component in potassium silicate solution as measured by the form of silicon dioxide to potasium silicate solution ranges from about 1:3 to about 1:10.

THE DIMENSION OF THE ZINC POWDER

It has been found that zinc powder should preferably be of a size between 20 to 200 microns. It is further believed that the zinc powder in all events should be less than 500 microns, since zinc particles larger than this tend to settle in the manifold valves, the cells, and/or the supply pipes, and thus impeded the flow of electrolytes therethrough. Additionally, it is believed that the zinc particles should be of a dendritic form so as to provide a desired amount of surface area for contacting the electrolyte.

THE ELECTROLYTE DISTRIBUTION SYSTEM

Figure 10:
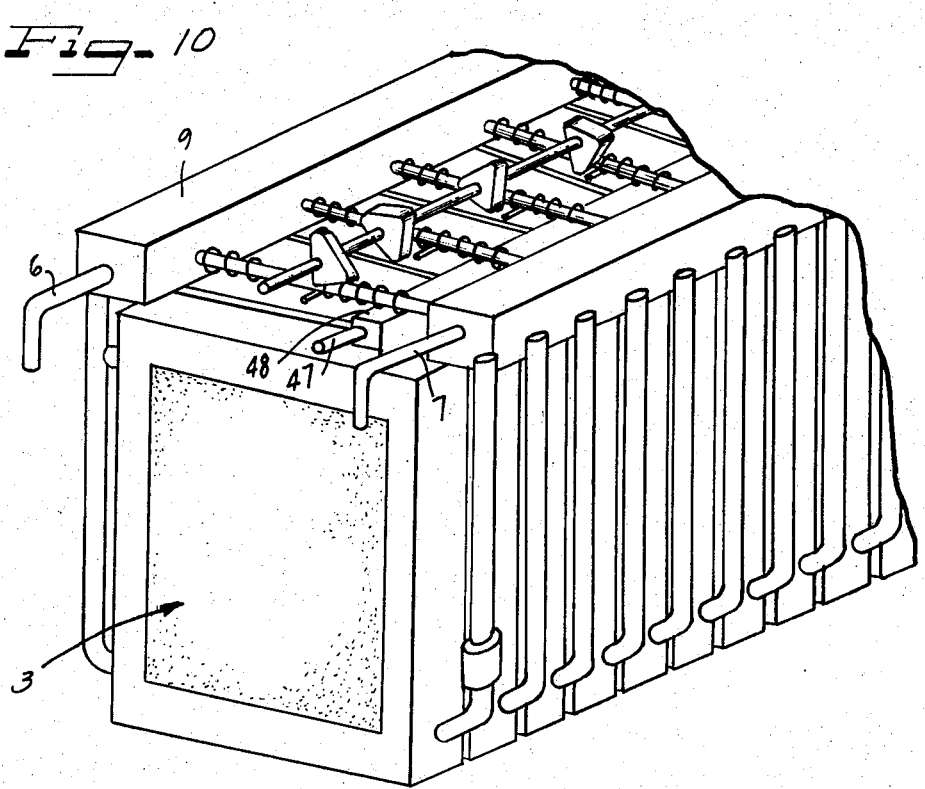
FIG. 10 is a fragmentary isometric view which schematically illustrates a portion of the metal fuel battery and part of the system.
Figure 12:
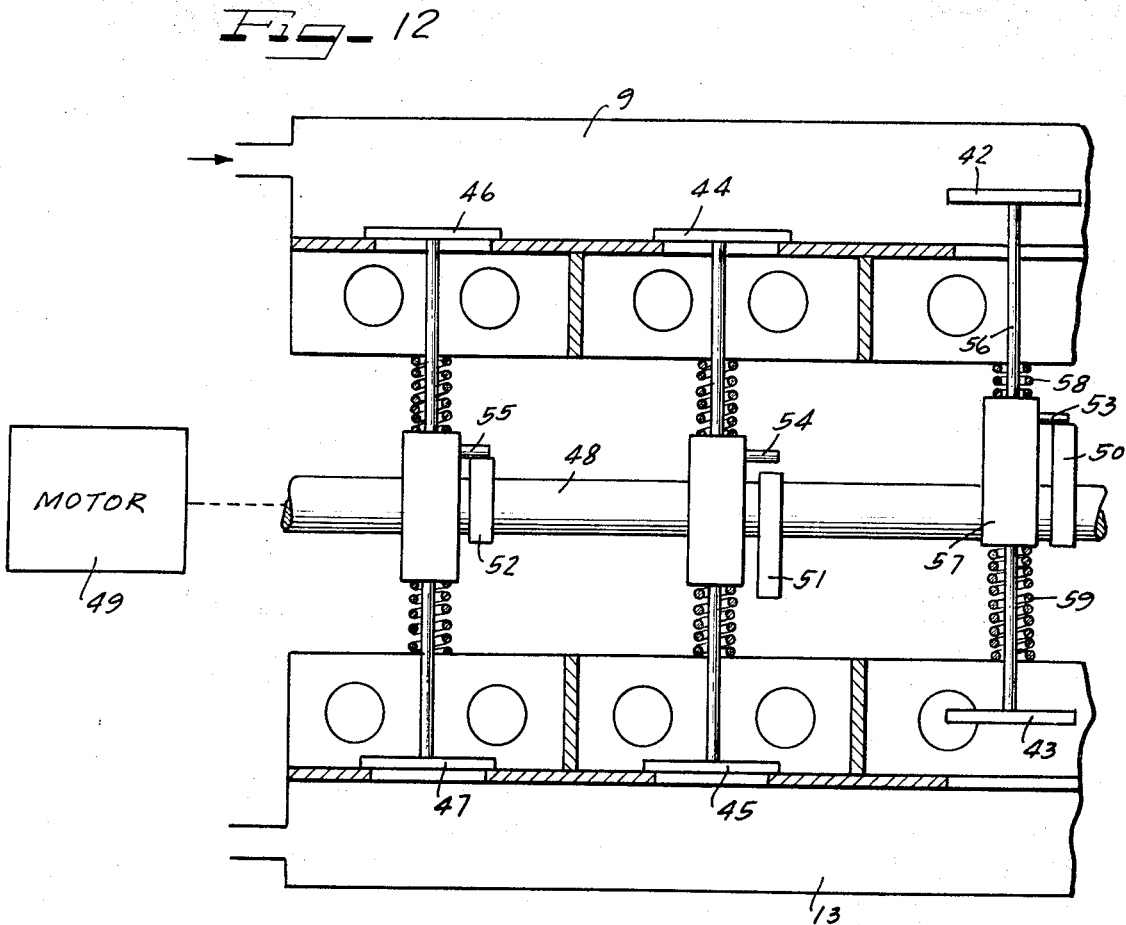
FIG. 12 is a diagrammatic view showing the feeding manifold and the collector manifold with their respective associated valving arrangements.

As diagrammatically illustrated in FIGS. 10 and 12 in particular, a valving arrangement is provided in which a valve 42 in the inlet manifold 9 is opened for one cell only at th same time that a valve 43 in the outlet manifold 13 of the same cell is opened. Another cell is provided with valves 44 and 45 and still another cell is provided with valves 46 and 47 in the inlet and outlet manifolds 9 and 13 respectively. Similar valves are provided for the other cells which make up the total battery. The valves are actuated from a cam shaft 48 rotated by a motor 49. Mounted on the cam shaft are a plurality of cams 50, 51 and 52 which are arranged to engage cam follower fingers 53, 54 and 55 respectively. The valves 42 and 43 are mounted on a common rod 56 reciprocably mounted in a bearing member 57 and springs biased by springs 58 and 59. A similar arrangement is provided for the adjacent cells. Where a twelve-cell battery is being used the preferred arrangement is to have a pair of valves like valves 42 and 43 opened for a period of approximately five to six seconds and then closed for a period of approximately fifty to fifty-five seconds. It has been found that the most efficient use of the metal fuel can be obtained by proportioning the cycling of the valves in this manner, for with this arrangement, only one cell at a time has electrolyte flowing therethrough while at the same time electrolyte is flowing in the system all of the ime.

THE FUEL FEED TO THE ELECTROLYTE

Figure 11:
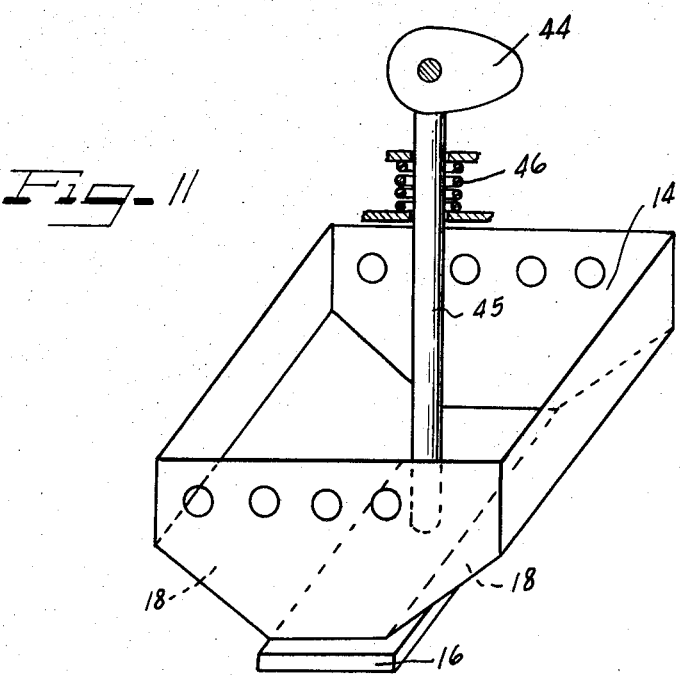
FIG. 11 is a diagrammatic view of the metal fuel hopper and valving arrangement for dispensing the metal fuel into the electrolyte.

As hereinbefore pointed out the fuel for the battery is finely divided zinc particles which are carried in suspension in the electrolyte. As the zinc is gradually used up by providing electrical power, the total quantity becomes gradually oxidized, and the portion thereof remaining in suspension becomes less capable of yielding electrical power, and a sediment of excess zinc formed in the bottom of the outlet duct 12 becomes less. It therefore becomes necessary to introduce additional zinc powder into suspension in the electrolyte. A hopper or storage bin 14 stocked with zinc particles and having a dispensing valve 16 is formed in the upper part of the electrolyte reservoir 4. This valve 16 is electrically operated by a timer actuating device 17 which is energized from time to time by a density sensing device 21. This may be an optical device such as diagrammatically represented in FIG. 4 where a light beam from a lamp 41 shines through window 42 onto a light receiving member 43, such as for example as a cadmium sulphide cell, a photo diode or the like. This member 43 transmits an electric signal to the valve actuting means 17 to open valve 16 for a predetermined time whenever the sediment level goes down to a point where the light beam is intercepted. When the light beam is intercepted no fuel is introduced into the electrolye from the hopper 14. A preferred amount of zinc in the electrolyte is that amount wherein approximately 100 grams of zinc per minute flow past the negative electrode. The valve actuating mechanism 17 may, by way of example, be a one-cycle timer switch which causes a cam 44 to rotate one revolution each time the mechanism is electrically energized. As the cam 44 rotates it pushes the valve stem 45 down against the action of a biasing spring 46 (see FIG. 11).

After the electrolyte has reached its saturation point and zinc oxide or other hydrated zinc compounds can no longer be dissolved in it, the reservoir 4 and system are suitably drained through any suitable outlet (not shown). New electrolyte and metal fuel powder are then introduced through reservoir inlets 19 and 20.

It will be recognized that the electrolyte stored in the reservoir 4 and cells 2 must be of sufficient quantity that the surface of the electrolyte lies above the inlet 6 of the reservoir 4. The finely divided zinc powder stored in the hopper 14 may be produced in any suitable manner such as by electrolytic extraction. This results in a grainy needle-like zinc powder. It is desirable that the zinc powder be introduced into the electrolyte stored in the reservoir 4 in a gradual manner to provide a predetermined concentration thereof in the electrolyte. It has been found best if this is done so that the feed of the metal fuel is at a substantially constant rate. This is facilitated by the inclined plates 18 which should be disposed at an angle in excess of 20° to the horizontal. The constant pumping of the electrolyte-fuel mixture from the reservoir 4 through the duct 6 and the withdrawal of this mixture from the cells and then pumped to the duct 7 into the reservoir 4 causes a continual motion of the electrolyte-fuel mixture in the reservoir at selected times sufficient to keep the metal fuel in suspension.

It will further be noted from the construction and arrangement of the electrodes that each cell is adapted to dissipate the zinc powder adhering to the negative collector plates 33 so as to maintain electrical discharge during stoppage of circulation of the electrolyte-fuel mixture to the cell. In other words, the present structure provides that an amount of metal fuel adheres to the negative electrode 33 sufficient in quantity to maintain electrical discharge without interruption while the fuel feed is stopped. The specific structure before described in connection with FIGS. 5, 6 and 7 assures adhesion or entrapment of a sufficient amount of fuel to the negative electrode 33 to accomplish this end.

An over-flow tube 47 is provided at the top of each cell as is shown in FIG. 2, which is connected to an over-flow return duct 48 leading to the reservoir 4 (see FIG. 10).

The baffles 37 (FIG. 9) enable the electrolyte to be fed at a uniform and high flow rate through the various cells and along each of the negative electrodes 33, and for this reason a predetermined amount of zinc powder adheres to the electrode 33 reacting with the hydroxy ions formed by the contact of oxygen atoms in the air with the oxidation catalyst (Ag) in the gas diffusion electrode. The zinc powder releases electrons and finally becomes zinc oxide or other hydrated zinc compounds.

It is preferable to circulate the electrolyte with practically no metal fuel powder mixed therein immediately before starting the operation and/or stopping the operation, thereby to wash away any discharged by-products deposited on the negative electrode 33 by previous circulation of the electrolyte immediately before stopping the operation and any other accumulated sludge and/or free fuel particles along the bottoms of the cells. This eliminates the possibility that zinc sedimented in the manifolds 7 and 13 by the circulation of the electrolyte immediately before stopping the operation will cause short-circuiting between the cells and allows partially spent zinc to be removed so that fresh zinc can be trapped by the negative electrode and provide the desired electrical power on starting the operation.

Where the metal fuel is intermittently supplied to the cells 2 and is caused to adhere to the negative electrode 33 thereby to maintain electrical discharge even while the electrolyte-fuel mixture circulation is suspended in a particular cell, the power of the feed and suction pumps 8 and 11 need not be as great as in the case of continuous circulation of electrolyte-fuel mixture to all cells. For example, the terminal voltage of one cell is about one volt, so in the case of a battery requiring twelve volts to one hundred volts output, it is necessary to provide twelve to one hundred cells connected in series. If the electrolyte-fuel mixture is to be continuously supplied to all of the cells it is obvious that a powerful feed pump and a powerful suction pump would be required. With the present invention, however, it is necessary only to have feed and suction pumps sufficiently strong to pump the electrolyte-fuel mixture to and from one cell at a predetermined flow velocity or in any event to a relatively small percentage of the total number of cells.

Figure 13:
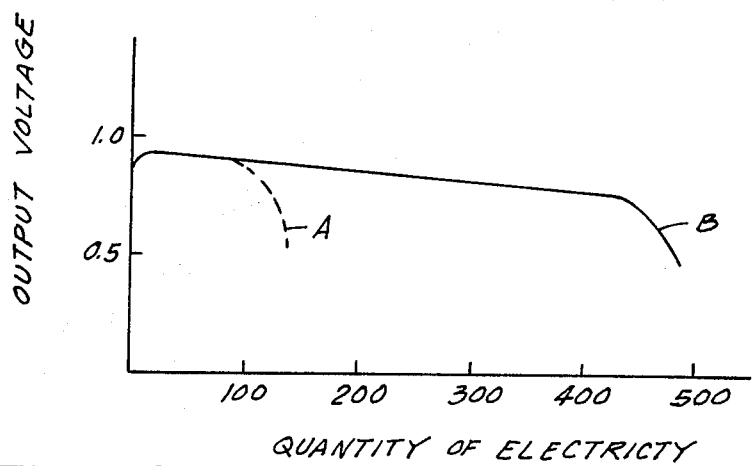
FIG. 13 is a graph of the output voltage of a cell with respect to the ampere hours of life before recyling of the metal fuel and electrolyte.

As illustrated in FIG. 13, the usable quantity of electricity can be increased from that shown in curve A to that shown in curve B by adding potassium silicate to the potassium hydroxide electrolyte so that additional amounts of spent metal fuel, e.g., ZnO or other zinc hydrate, are soluble within the electrolyte and the system continues to operate and provide additional electricity.

SUMMARY

The foregoing described invention provides an electrical battery which can be connected to a load such as an electric motor for long periods of time. It operates at normal ambient temperatures. It employs no dangerous chemical elements as fuel, such as for example, as hydrogen. The electrolyte and zinc oxide can be regenerated with ease and at small cost. The initial cost of the battery is relatively low and the cost of the metal fuel is relatively low. It has a capacity sufficient to drive passenger automobiles at acceptable high speeds for periods of from five to ten hours.

I claim as my invention:

1. A metal fuel battery having a plurality of cells, each cell comprising liquid containing chamber having an electrolyte containing metal fuel particles in suspension therein, at least one upstanding wall formed of a gas diffusion positive electrode which is impervious to liquid but through which an oxygen containing gas will pass, a high conductivity plate-like negative electrode mounted in each cell in spaced relation to said positive electrode, said negative electrode having upwardly facing metal fuel particle receiving formations for accumulating some of said fuel particles thereon, and means for feeding said electrolyte with its metal fuel particles in suspension selectively to first one cell and then another.

2. A metal fuel battery according to claim 1 in which the metal fuel is zinc having a particle size of from 20 to 200 microns.

3. A metal fuel battery according to claim 1 in which the metal fuel is zinc having a particle size of less than 500 microns.

4. A metal fuel battery according to claim 1 in which said positive electrode includes a nickel screen embedded in a pressed powder plate having a composition of starting materials comprised of approximately 6.7% by weight of silver oxide powder, 43% by weight of polytetrafluoroethylene powder, 23% by weight of carbon powder and 27.3% by weight of ammonium carbonate powder.

5. A metal fuel battery according to claim 1 in which said electrolyte is potassium hydroxide having between 200 cc. and 300 cc. of potassium silicate solution wherein the weight ratio of silicon dioxide to potassium silicates solution ranges from about 1:3 to about 1:10 per liter of potassium hydroxide.

6. A metal fuel battery comprising a plurality of liquid-containing chambers each having a plurality of walls, at least one of said walls having a porous plate-like positive electrode, a negative electrode mounted in each of said chambers in spaced relation to said positive electrode, said positive electrode being a gas diffusion electrode including a catalyst therein, said negative electrode being a low electrical resistivity plate-like member, the liquid electrolyte having a finely divided metal fuel powder suspended therein, said negative electrode having a plurality of upwardly facing pocket-like formations for accumulating some of said metal fuel powder thereon, said liquid-containing chambers each having an inlet and an outlet for said liquid electrolyte, and means for intermittently and sequentially circulating said electrolyte through said chambers.

7. A metal fuel battery comprising:
 a plurality of liquid-containing cells having a plurality of walls, at least one of said walls having a gas diffusion positive electrode, said positive electrode including a metal oxidation catalyst, a low electrical resistivity plate-like portion and a porous backing member which permits the passage of an oxygen-containing gas therethrough but is impervious to liquids;
 a liquid electrolyte having a finely divided zinc metal fuel powder suspended therein, said electrolyte including a soluble alkali metal salt for increasing the solubility of any spent zinc metal fuel powder in said electrolyte;
 a negative electrode mounted in said relation to said positive electrode, said negative electrode being a low-electrical resistivity plate-like member having upwardly facing receiving formations for accumulating some of said zinc powder thereon, said liquid containing cells each having an inlet and an outlet means;

a supply means for said liquid electrolyte having zinc metal fuel powder suspended therein;

a metering means between said supply means and said cells for selectively providing communication between said supply means and said cells; and a regulating means between each of said cells and said supply means for selectively intermittently interconnecting at least one of said cells to said supply means for providing a liquid electrolyte-zinc metal fuel powder mixture to said cell and substantially simultaneously removing spent liquid electrolyte-zinc metal fuel powder mixture from said one cell.

8. A metal fuel battery as defined in claim 7 wherein the negative electrode comprises a unitary member having at least one outer layer of a planar metallic sheet having a plurality of pocket-like portions outstanding from said outer layer and an inner layer of a metallic screen-like network.

9. A metal fuel battery as defined in claim 7 wherein the metal fuel powder is a zinc powder having an average particle size of less than about 500 microns.

10. A metal fuel battery as defined in claim 9 wherein the zinc powder has an average particle size ranging from about 20 microns to about 200 microns.

11. A metal fuel battery as defined in claim 7 wherein the electrolyte contains a soluble alkali metal salt selected from the group consisting essentially of potassium silicate, sodium silicate, potassium phosphate, sodium phosphate and mixtures thereof, said electrolyte being potassium hydroxide.

12. A metal fuel battery as defined in claim 7 in which said electrolyte is potassium hydroxide having between 200 cc. and 300 cc. of potassium silicate solution per liter of potassium hydroxide wherein the weight ratio of silicon dioxide to potassium silicate solution ranges from about 1:3 to about 1:10 per liter of potassium hydroxide.

13. A metal fuel battery as defined in claim 7 wherein the gas diffusion positive electrode comprises a porous bonded matrix of water-repellent polymer particles having silver coated electrically conductive material particles substantially homogeneously interspersed and adhering to said matrix and a metallic screen-like member embedded within said matrix.

14. A metal fuel battery as defined in claim 7 wherein the gas diffusion positive electrode comprises a porous bonded matrix of water-repellent polymer particles having silver particles and other electrically conductive material particles substantially homogeneously interspersed and adhering to said matrix and a metallic screen-like member embedded within said matrix.

15. A metal fuel battery as defined in claim 7 wherein the regulating means includes a sensing means for determining the amount of metal fuel powder in the electrolyte and an actuating means operatively interconnecting said regulating means and the metering means for selectively providing metal fuel powder to the electrolyte.

16. A metal fuel battery comprising:

a metal fuel powder supply chamber;

a liquid electrolyte supply chamber;

means for selectively dispersing portions of a metal fuel powder from said metal fuel powder supply chamber into a liquid electrolyte within said liquid electrolyte supply chamber;

a plurality of liquid-containing cells having a plurality of walls, at least one of said walls having a gas diffusion positive electrode, said positive electrode including a metal oxidation catalyst, a low electrical resistivity plate-like portion and a porous backing member which permits the passage of an oxygen-containing gas therethrough but is impervious to liquids, a high conductivity plate-like negative electrode mounted in each cell in spaced relation to said positive electrode, said negative electrode having upwardly facing metal fuel powder receiving formations for accumulating some of said fuel powder thereon; and means for circulating a liquid electrolyte having a metal fuel powder dispersed therein intermittently through each of said cells.

17. A metal fuel battery as defined in claim 16 wherein the electrolyte is a potassium hydroxide solution containing a soluble alkali metal salt therein and the metal fuel is fine particles of zinc.

18. In a metal fuel battery having a plurality of cells, each cell comprising a liquid-containing chamber having an electrolyte containing metal fuel particles in suspension therein, at least one wall formed of a gas diffusion positive electrode which is impervious to liquid but through which an oxygen-containing gas will pass, and a high conductivity plate-like negative electrode mounted in each cell in spaced relation to said positive electrode and having means for retaining said metal fuel particles thereon; the improvement comprising in that said plurality of cells are divided into a plurality of groups, said groups having at least one valve means respectively, an actuating means interconnecting said valve means for feeding said electrolyte-containing metal fuel particles therein periodically to a first group of cells and then to another group of cells so that some of said fuel particles are accumulated on said means for retaining said fuel particles within each of said cells.

19. In a metal fuel battery as defined in claim 18 wherein said actuation means includes a sensing means for determining the amount of metal fuel particles in the electrolyte, said sensing means producing an appropriate signal in accordance with the amount of particles in the electrolyte, and a dispensing means interconnecting with said actuating means for supplying said metal fuel particles into said electrolyte in response to said signal produced by said sensing means.

20. In a metal fuel battery as defined in claim 18 wherein each of said plurality of groups includes an additional valve means interconnected with said one valve means for controlled opening and closing substantially simultaneously with said one valve means.

21. In a metal fuel battery as defined in claim 18 including a metal fuel particle supply chamber and a liquid electrolyte supply chamber, said chambers being interconnected with at least one of said valve means and being formed integrally with one another.

References Cited

UNITED STATES PATENTS

| 2,921,110 | 1/1960 | Crowley et al. | 136—86 A |
|---|---|---|---|
| 1,541,699 | 6/1925 | Freeth et al. | 136—157 |
| 3,297,484 | 1/1967 | Niedrach | 136—86 D |
| 3,391,027 | 7/1968 | Porter | 136—86 A |
| 3,409,471 | 11/1968 | Sturm et al. | 136—86 E |

FOREIGN PATENTS

| 28,658 | 1968 | Japan | 136—86 A |
|---|---|---|---|
| 117,837 | 6/1957 | Russia | 136—86 A |
| 6811289 | 2/1969 | Netherlands. | |

ALLEN B. CURTIS, Primary Examiner